(12) United States Patent
Lin et al.

(10) Patent No.: US 8,218,004 B2
(45) Date of Patent: Jul. 10, 2012

(54) DISPLACEMENT SENSING SYSTEM

(75) Inventors: Chern-Sheng Lin, Taichung (TW);
Chia-Tse Chen, Taichung (TW);
Tzu-Chi Wei, Taichung (TW);
Wei-Lung Chen, Taichung (TW);
Chia-Chang Chang, Taichung (TW)

(73) Assignee: Cycling & Health Tech Industry R&D Center, Taichung (TW)

( * ) Notice: Subject to any disclaimer, the term of this patent is extended or adjusted under 35 U.S.C. 154(b) by 477 days.

(21) Appl. No.: 12/589,376

(22) Filed: Oct. 22, 2009

(65) Prior Publication Data

US 2011/0096161 A1    Apr. 28, 2011

(51) Int. Cl.
*H04N 7/18* (2006.01)
*G06F 12/00* (2006.01)

(52) U.S. Cl. .................................................. 348/139

(58) Field of Classification Search ........... 348/139–143
See application file for complete search history.

(56) References Cited

U.S. PATENT DOCUMENTS

| | | | |
|---|---|---|---|
| 2004/0100465 A1* | 5/2004 | Stowe et al. | 345/427 |
| 2008/0147987 A1* | 6/2008 | Cantin et al. | 711/141 |
| 2010/0021012 A1* | 1/2010 | Seegers et al. | 382/113 |
| 2010/0133351 A1* | 6/2010 | Yoshida | 235/494 |
| 2010/0142454 A1* | 6/2010 | Chang | 370/329 |
| 2011/0055927 A1* | 3/2011 | Hamilton et al. | 726/26 |

* cited by examiner

*Primary Examiner* — Zarni Maung
(74) *Attorney, Agent, or Firm* — Charles E. Baxley

(57) ABSTRACT

A displacement sensing system is disclosed. Two image capturing devices are settled at to opposite ends of a coordinate axis of the planar area, respectively, for capturing images of the planar area and an object placed thereon. Four pre-established LUT databases and an interactive four-matrix lookup table process are implemented to determine actual coordinates of the object on in the planar area.

11 Claims, 11 Drawing Sheets

DISPLACEMENT SENSING SYSTEM

BACKGROUND OF THE INVENTION

1. Technical Field

The present invention relates to a technology for sensing displacement and positioning an object in a real-time manner. More particularly, the present invention relates to a displacement sensing system using two image-capturing devices and a 4-matrix lookup table method to determine a coordinate-based position of an object in a specified planar area.

2. Description of Related Art

The technology of sensing displacement and positioning an object in a specified planar area defined by coordinates has been maturely applied to touch panels.

While a conventional touch panel is advantageous for its high accuracy and fast reaction, it has such disadvantage that the bigger in size the panel is made, the higher the manufacturing cost is and the higher the defective rate is.

With the attempt to reduce the manufacturing cost, some technologies using image-capturing devices, illuminated marks affixed to moving objects, and operational programs have been proposed for the purposes of calculating displacement and positions of the objects with respect to large planner areas defined by coordinates so as to obtain spatial information of the objects. For example, U.S. Pat. No. 4,672,562 titled "Method and apparatus for determining location and orientation of objects", wherein an orthogonally related target point array is provided in fixed relationship to an object and a photo detector image plane obtains images of the target points projected through a lens located a fixed distance from the image plane so that through algebraic manipulation, spatial information about the object can be obtained.

SUMMARY OF THE INVENTION

The present invention herein provides a novel technical approach to displacement sensing and coordinate-based positioning of an object in a planar area of a large or ultra large size.

Herein, as coincident to general understanding, the term "large" when used in conjunction with the term "size" or "area" is for describing a display screen or a touch panel to be used in an ATM, an information kiosk, an industrial touch-control computer, or an instrument, while the phase "ultra large" when used in conjunction with the term "size" or "area" is for describing a display screen or a touch panel to be used in a large display device or an electronic billboard for exhibition, presentation, performance, or digital advertising.

The present invention provides a system for sensing displacement and determining coordinates of an object in a specified area defined by planar coordinates, wherein the system and the method are particularly suitable for displacement sensing and coordinate-based positioning of an object in a planar area of a large or ultra large size.

As compared with the touch panels of the prior art, the present invention requires less fabrication costs. As compared with the known technology that uses an image capturing device with illuminated marks affixed to moving objects, the present invention solves the problems of the limited shooting range and light noise interference determination of positioning. Furthermore, the present invention has additional advantages such as enlarging sensing area, enhancing accuracy of coordinate positioning, and improving reaction clearance, thus allowing displacement sensing and coordinate positioning in a real-time manner.

To achieve the above objectives of the present invention, the system includes: two image capturing devices settled at two opposite ends of a coordinate axis on a planar area for capturing images of the planar area and an object on the planar area. Four preset LUT databases and an interactive four-matrix lookup table process are used to determine actual coordinates of the object in the planar area.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein.

DETAILED DESCRIPTION OF THE PREFERRED EMBODIMENT

The present invention relates to a displacement sensing system using two image-capturing devices and a 4-matrix lookup table method to determine a coordinate-based position of an object in a specified planar area.

The system includes a planar area 10, a first image capturing device 21, and a second image capturing device 22.

Figure 1:
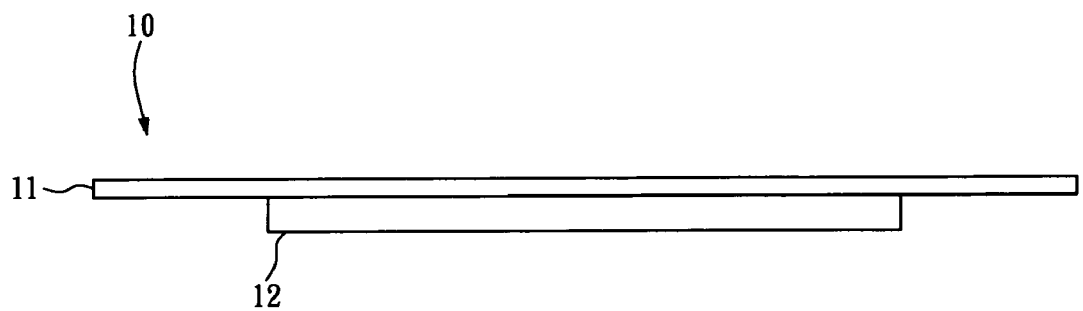
FIG. 1 is a schematic cross-sectional drawing showing a planar area of the present invention realized as a movable module.

As shown in FIG. 1, the planar area 10 is a front surface of an LCD 12 covered by a wrapping material 11 which is based on tempered glass or acrylic resin. The planar area 10 is formed as a movable module, which may be placed on platforms of different heights or settled on an immovable external object in a vertical position or a horizontal position, according to practical needs.

Figure 2:
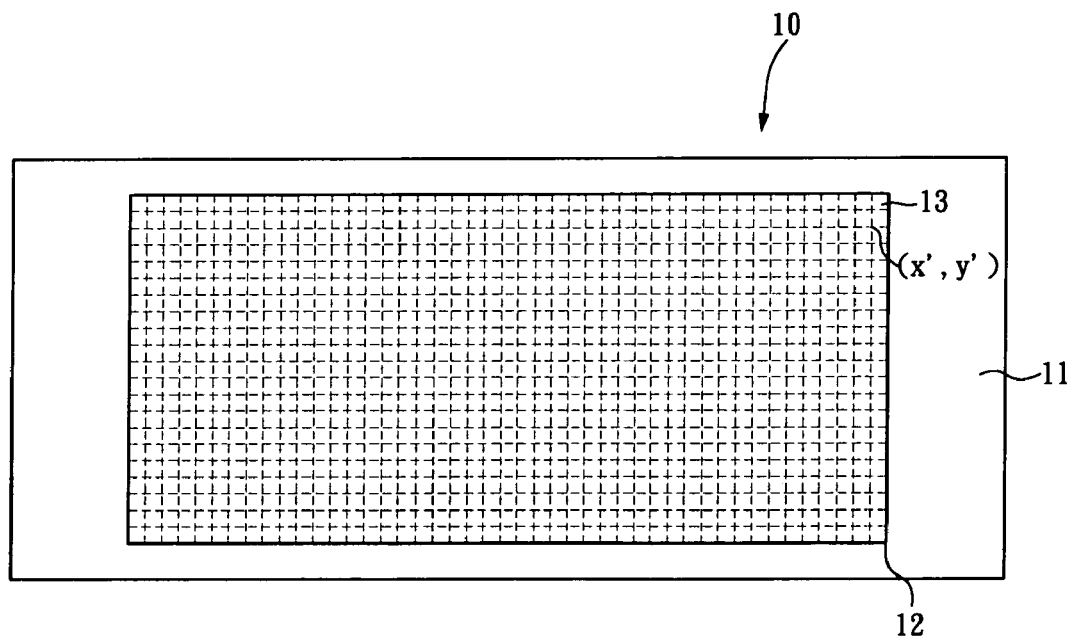
FIG. 2 is a top view of the planar area of the present invention.
Figure 3:
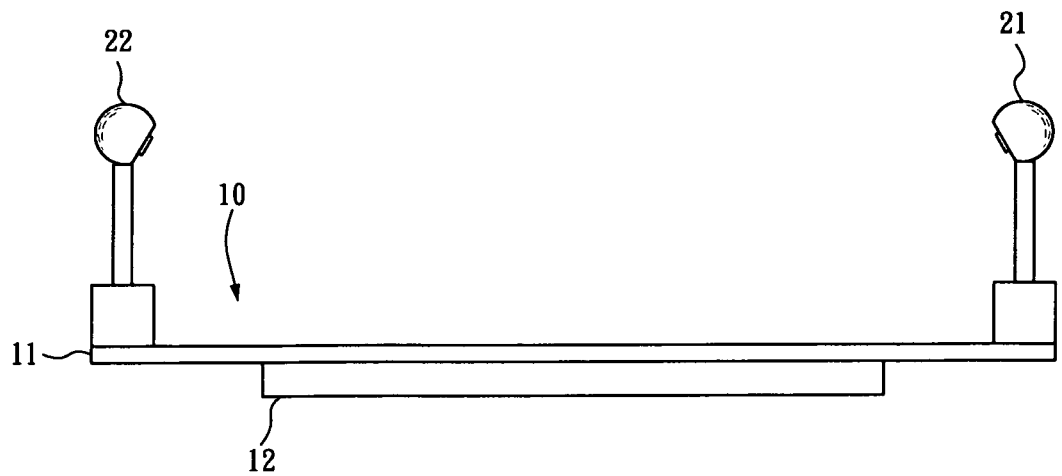
FIG. 3 is a side view of the planar area of the present invention.

As shown in FIG. 2, the LCD 12 of the planar area 10 is preprogrammed into M×N virtual, equal grids 13. Each intersection point between two adjacent said grids 13 has been programmed as having a known set of actual coordinates (x', y'). As shown in FIG. 3, a first image capturing device 21 and a second image capturing device 22 are arranged at two opposite ends of one of coordinate axes (axis X and axis Y) of the planar area 10, respectively, so that the planar area 10 is imaged at the first image capturing device 21 and the second image capturing device 22. The first image capturing device 21 and the second image capturing device 22 are identical in any respect, such as height, shooting angle, image definition and so on.

Figure 4:
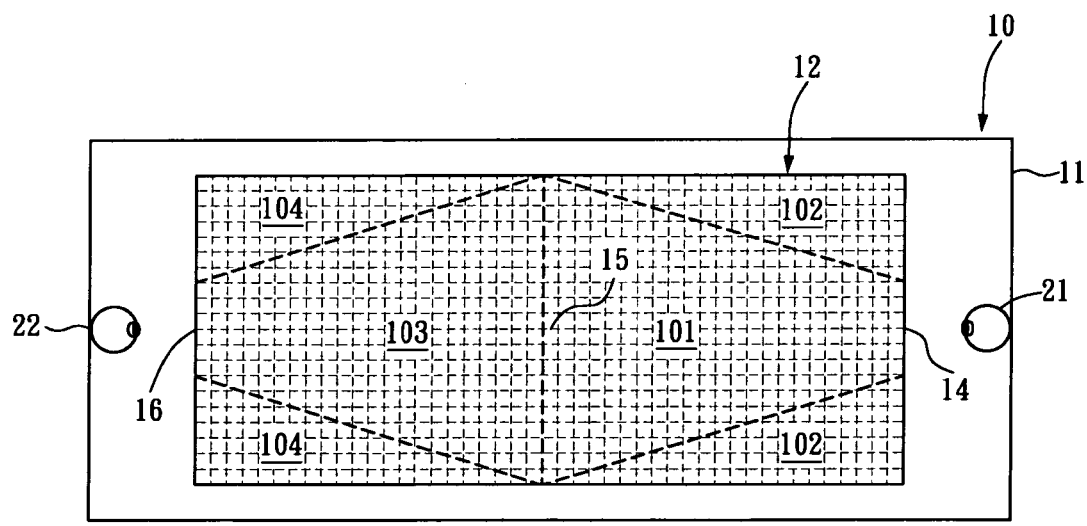
FIG. 4 illustrates a first block, a second block, a third block, and a fourth block contained in the planar area.
Figure 5:
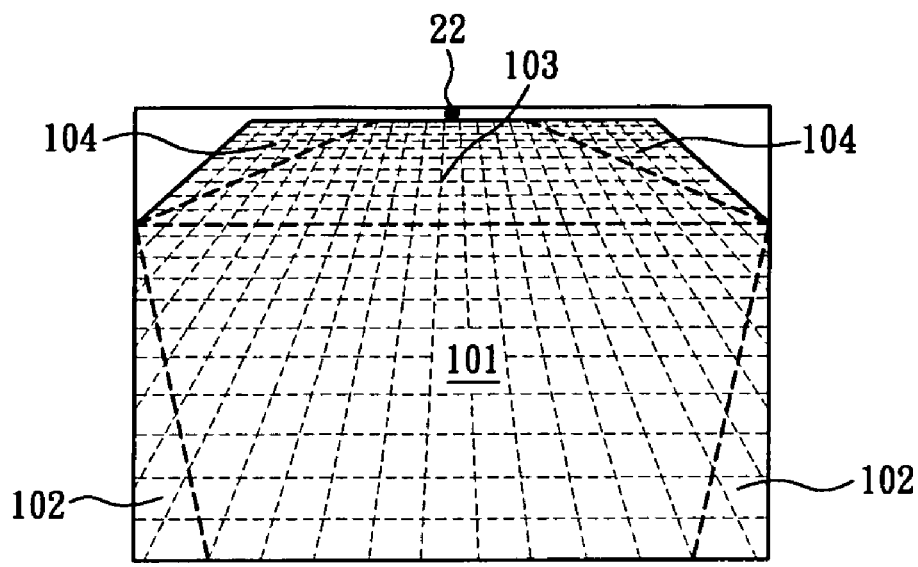
FIG. 5 is a drawing simulating an image captured by a first image capturing device of the present invention.
Figure 6:
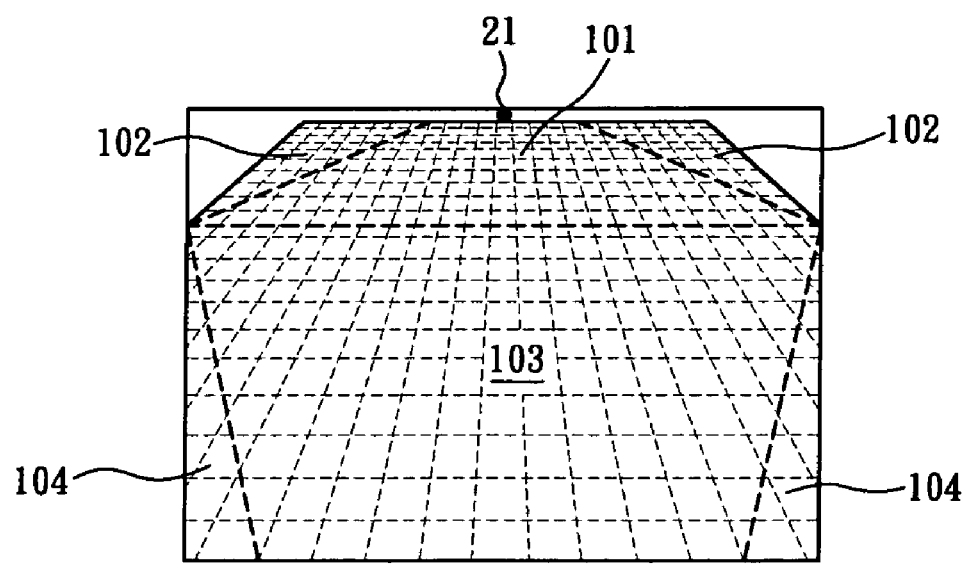
FIG. 6 is a drawing simulating an image captured by a second image capturing device of the present invention.

As shown in FIG. 4, according to shooting ranges and dead spaces of the first image capturing device 21 and the second image capturing device 22, a first block 101, a second block 102, a third block 103, and a fourth block 104 are defined in the planar area 10 in a virtual manner. Therein, the first block 101 is subject to the shooting range of the first image capturing device 21, substantially extending from a first edge 14 of the planar area 10 to a minor symmetry axis 15 of the planar area 10. The third block 103 is subject to the shooting range of the second image capturing device 22, substantially extending from a second edge 16 of the planar area 10 to the minor symmetry axis 15 of the planar area 10. The second block 102 is subject to the shooting dead space of the first image capturing device 21, located separately at two corners of the planar area 10 adjacent to the first edge 14. The fourth block 104 is subject to the shooting dead space of the second image capturing device, located separately at two corners of the planar area 10 adjacent to the second edge 16. As shown in FIG. 5 and FIG. 6, the shooting range of the first image capturing device 21 includes the first block 101 and the fourth block 104, while the shooting range of the second image capturing device 22 includes the third block 103 and the second block 102. By the division and cooperation of the first image capturing device 21 and the second image capturing device 22, there is no detecting dead space in the planar area 10.

Figure 7:
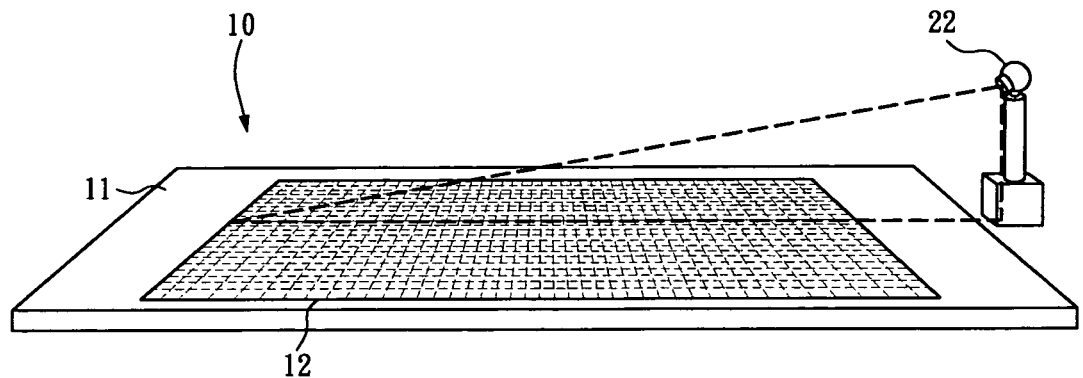
FIG. 7 shows the planar area and one of the image capturing devices, illustrating the relation between the height of the image capturing device and the accuracy of the system of the present invention.
Figure 8:
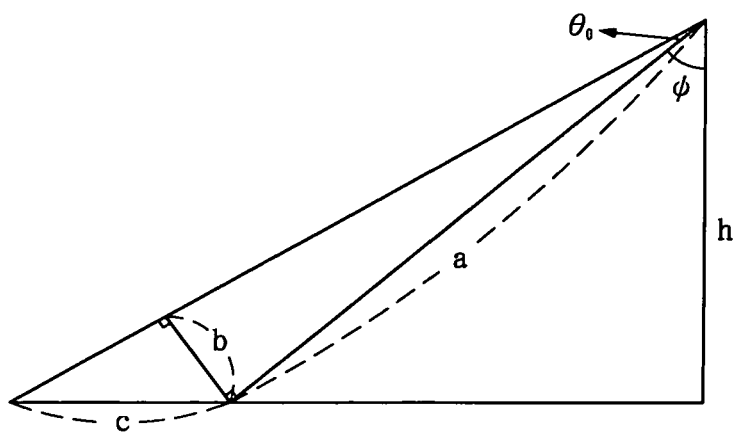
FIG. 8 illustrates the relation between the height of the image capturing device and the shooting range.

As shown in FIG. 7 and FIG. 8, assuming that h is the height where the image capturing devices are settled; ψ is the image capturing device shooting range; $\theta_0$ is the unit angle of ψ; and c is the image length corresponding to every unit angle. For deriving the image length corresponding to every unit angle, values of a, b, and c in the drawing can firstly be obtained from Equation 1.

$$a = \frac{h}{\cos\phi}$$

$$b = \frac{h \times \tan\theta_0}{\cos\phi}$$

$$c = \frac{h \times \tan\theta_0}{\cos^2\phi}$$

Equation 1

Through Equation 1, the length of the image taken in every unit shooting angle can be learned. When the value of h is changed, the variation of "c" is observed. Assuming that the planar area 10 is sized 82 cm×46 cm, when the image capturing device has its altitude set as 8 cm, 14.5 cm, and 19.5 cm, the corresponding values of "c" are 0.174 cm, 0.3154 cm, and 0.424 cm, respectively. Therefore, it is proven that the higher the image capturing device is placed, the more image data are processed in the range of every unit angle, meaning a relatively accurate positioning effect of the system. Thus, in setting the hardware, it is preferred to set the image capturing device at an appropriate height, so as to ensure the accuracy of the positioning effect of the system.

Then, it is to be explained how the system works with an interactive four-matrix lookup table (4-LUT) process in detecting coordinates of an object in the foregoing planar area 10.

In the art of image processing, it is known that a lookup table (LUT) mainly serves to associate an index value with an output. The interactive four-matrix lookup table (4-LUT) process in the present invention is subdivided into a first matrix lookup table process, a second matrix lookup table process, a third matrix lookup table process and a fourth matrix lookup table process. Prior to conducting the interactive four-matrix lookup table process, a first LUT database, a second LUT database, a third LUT database, and a fourth LUT database are required to be established for its use.

Figure 9:
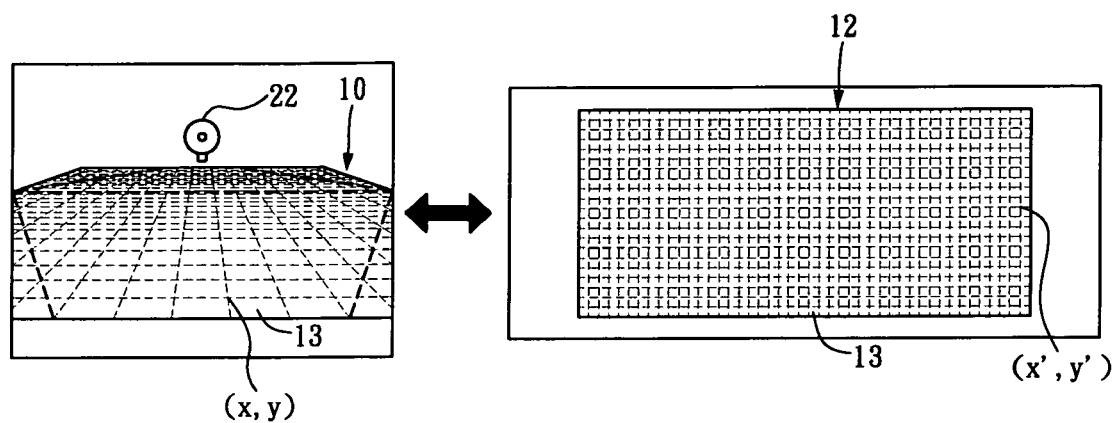
FIG. 9 explains a method for producing a LUT database according to the present invention.

A method for generating the LUT databases, as shown in FIG. 9, includes the steps of: obtaining actual coordinates (x', y') of the grids 13 of the planar area 10; obtaining coordinates (x, y) of the images of the planar area 10 taken by the first image capturing device 21 and the second image capturing device 22; and associating the image coordinates (x, y) with the corresponding actual coordinates (x', y').

In the present invention, the LUT databases are generated through the following steps.

In Step 1, the LCD 12 of the planar area 10 is preprogrammed into grids 13 in the amount of M×N. Every intersection point between two adjacent grids 13 has its coordinates defined as actual coordinates (x', y').

Figure 10:
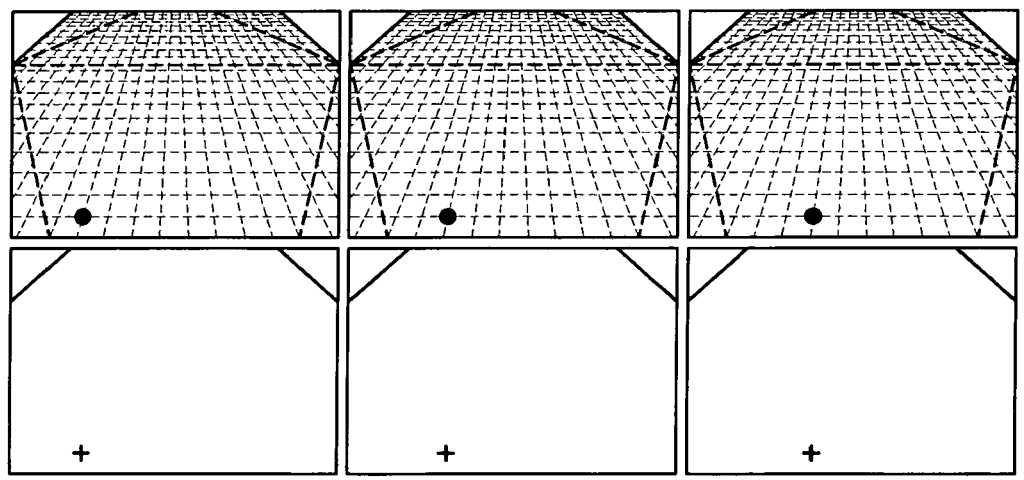
FIG. 10 depicts image taking and calibration of actual coordinates and image coordinates according to the present invention.
Figure 11:
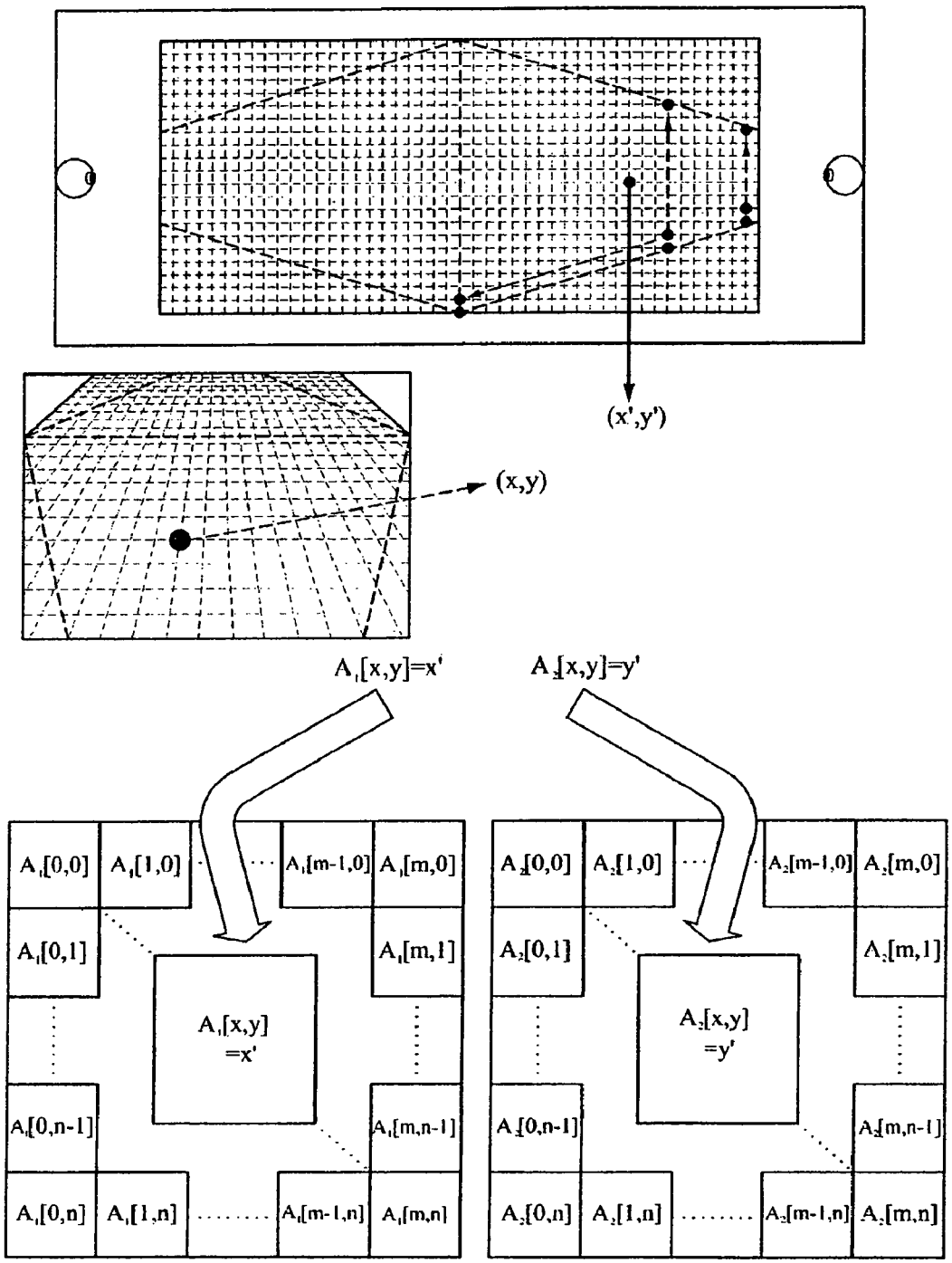
FIG. 11 provides steps of image taking and calibration of actual coordinates and image coordinates according to the present invention.

In Step 2, the LCD 12 is toned with a pure color. Then it is programmed to automatically exhibit all the intersection points in the blocks under the care of the first image capturing device 21 in sequence. Each of the intersection points of the grids 13 in the LCD 12 is denoted by a "+", as shown in FIG. 10. In the present step, as shown in FIG. 11, every time a said intersection point is shown, the image capturing device takes its image. The coordinates (x, y) of the intersection point in the image is recorded and corresponded to its actual coordinates (x', y').

Table $A_1$ below is exclusively corresponding to x in the coordinates of the actual position, while Table $A_2$ is exclusively corresponding to y. The relation between the LUT $A_1$ and LUT $A_2$ can be described by Equation 2 below:

$$\begin{cases} A_1(x, y) = x' \\ A_2(x, y) = y' \end{cases}$$

Equation 2

Figure 12:
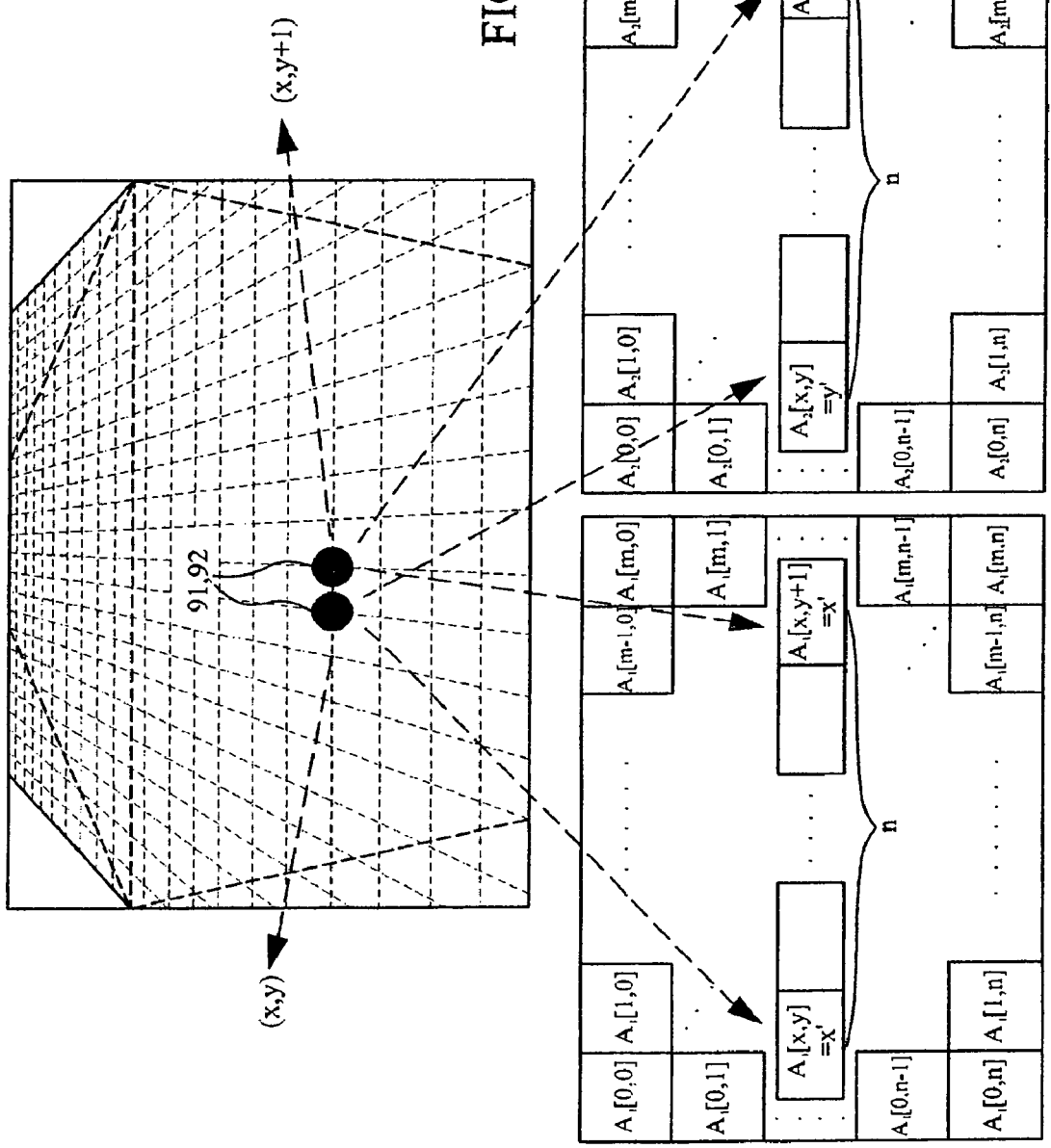
FIG. 12 shows a calibration point of a block relatively close to the image capturing device.

In Step 3, as shown in FIG. 12, for calibrating the block relatively close to the image capturing device, a distance between a calibration point 91 (x', y') and its next calibration point 92 (x',y'+1) of the actual coordinates is relatively large. Thus, when the calibration points in the LUT are relatively far from each other, points in the LUT between the two calibration points 91, 92 have no corresponding values. In this case, an interpolation method is used to make up the values between the calibration points 91, 92 in the LUT. The method can be expressed as Equation 3:

$$\text{if} \begin{cases} A_1(x, y) = x', A_1(x+n, y) = x'+1 & \text{then } A_1(x+i, y) = x' + \dfrac{(x'+1)-(x')}{(x+i)-(x)} \times i, i = 1, 2, 3 \ldots n \\ A_2(x, y) = y', A_2(x+n, y) = y' & \\ & \text{then } A_2(x+i, y) = y', i = 1, 2, 3, \ldots n \end{cases} \quad \text{Equation 3}$$

Figure 13:
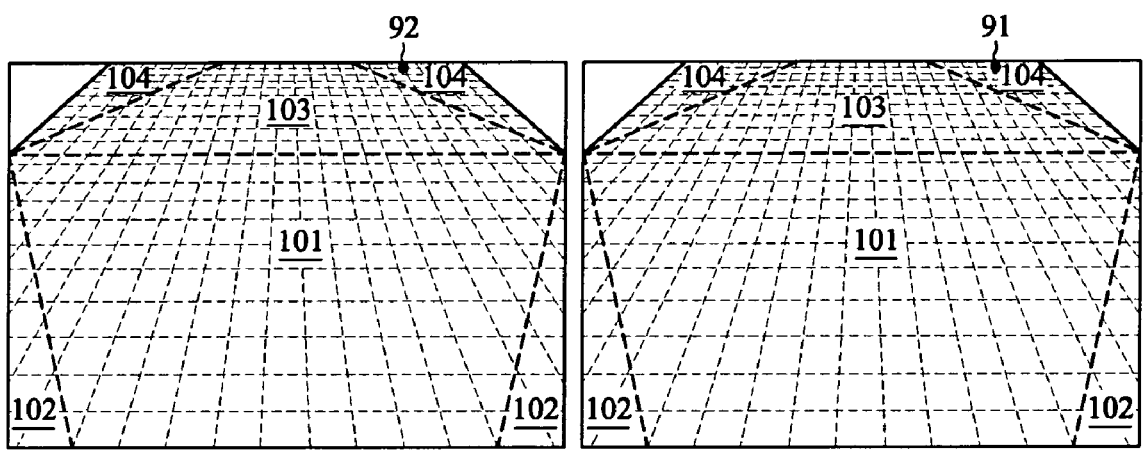
FIG. 13 shows a calibration point of a block relatively far from the image capturing device.

As shown in FIG. 13, for calibrating the relatively far block, due to the limited definition performed by the image capturing device, when the calibration points 91, 92 are close to a certain extent, the system is likely to wrongly determine that the displacement between the calibration points is null or the coordinates of the two calibration points are identical. In this case, the values in the LUT corresponding to the two calibration points 91, 92 are set equal to those of the last calibration point, as expressed by Equation 4:

$$\text{if} \begin{cases} A(x+1, y) \leq A(x, y) = x' & \text{then } A(x+1, y) = x' \\ A(x, y+1) \leq A(x, y) = y' & \text{then } A(x, y+1) = y' \end{cases} \quad \text{Equation 4}$$

In Step 4, the procedures taken in Steps 2 and 3 are repeated by the second image capturing device 22, so as to define all points in the LCD 12 in a corresponding LUT database.

In Step 5, a table index is made for determining whether switch between the image capturing devices is necessary or for determining whether the object is out of bounds. After the completion of the first and second LUT databases for the blocks in the shooting range of the first image capturing device 21, for the rest of the area, where a point is in the blocks in the shooting range of the second image capturing device 22, an index value b is filled in the third and fourth LUT database; otherwise, an index value o is filled therein.

Assuming that image coordinates (x, y) denote a point in an image taken by the image capturing device; $A_a$ represents the block associated with the first image capturing device 21; $A_b$ is the block associated with the second image capturing device 22; and $C_f$ determines the switch between the first image capturing device 21 and second image capturing device 22 for acquiring the image, in turn deciding that the image coordinates (x, y) locate in $A_a$ or $A_b$. Equation 6 is constructed:

$$C_f = \begin{cases} 1, & (x, y) \in A_a \\ 2, & (x, y) \in A_b \end{cases} \quad \text{Equation 6}$$

When the image coordinates (x, y) coordinates locate in the block $A_a$, $C_f$=1 and the image is provided by the first image capturing device 21. When the image coordinates (x, y) coordinates locate in the block $A_b$, $C_f$=2 and the image is provided by the second image capturing device 22.

The first and fourth LUT databases as well as the first and the fourth matrix lookup table processes are applied to the block associated with the first image capturing device 21. The third and second LUT databases as well as the third and second matrix lookup table processes are applied to the block associated with the second image capturing device 22.

Through the interactive four-matrix lookup table process, the actual coordinates of the object can be derived. The table indexes $A_1$, $A_2$, $A_3$, and $A_4$ below respectively describe types of the values possibly existing in the LUT databases corresponding to the first image capturing device 21 and the second image capturing device 22.

| $A_1$ | |
|---|---|
| Type | Description |
| x' | actual x' coordinate corresponding to (x, y) |
| B | switching to second image capturing device 22, $C_f$ = 2 |
| o | out of specified area |

| $A_2$ | |
|---|---|
| Type | Description |
| y' | actual y' coordinate corresponding to (x, y) |
| b | switching to second image capturing device 22, $C_f$ = 2 |
| o | out of specified area |

| $A_3$ | |
|---|---|
| Type | Description |
| x' | actual x' coordinate corresponding to (x, y) |
| A | switching to first image capturing device 21, $C_f$ = 1 |
| o | out of specified area |

| $A_4$ | |
|---|---|
| Type | Description |
| y' | actual y' coordinate corresponding to (x, y) |
| a | switching to first image capturing device 21, $C_f$ = 1 |
| o | out of specified area |

Thus, according to the table indexes A1, A2, A3, and A4, by implementing the interactive four-matrix lookup table process, it is obtained that:

$$\text{if}(A_1(x, y) \neq b \wedge A_1(x, y) \neq o \wedge C_f = 1) \quad \text{Equation 7}$$
$$\begin{cases} x' = A_1(x, y) \\ y' = A_2(x, y) \end{cases}$$

-continued $$\text{if}(A_3(x, y) \neq a \wedge A_3(x, y) \neq o \wedge C_f = 2) \quad \text{Equation 8}$$
$$\begin{cases} x' = A_3(x, y) \\ y' = A_4(x, y) \end{cases}$$

As expressed by Equation 7, when $A_1(x, y)$ corresponding to the image coordinates (x, y) is not equal to b, and the image coordinates (x, y) is within the specified area, and the image is provided by the first image capturing device 21, the values of x' and y' can be derived from $A_1$, and $A_2$, respectively. In Equation 8, when $A_3(x, y)$ corresponding to the image coordinates (x, y) is not equal to b, and the image coordinates (x, y) is within the specified area, and the image is provided by the second image capturing device 22, the values of x' and y' can be derived from $A_3$, and $A_4$.

Figure 14:
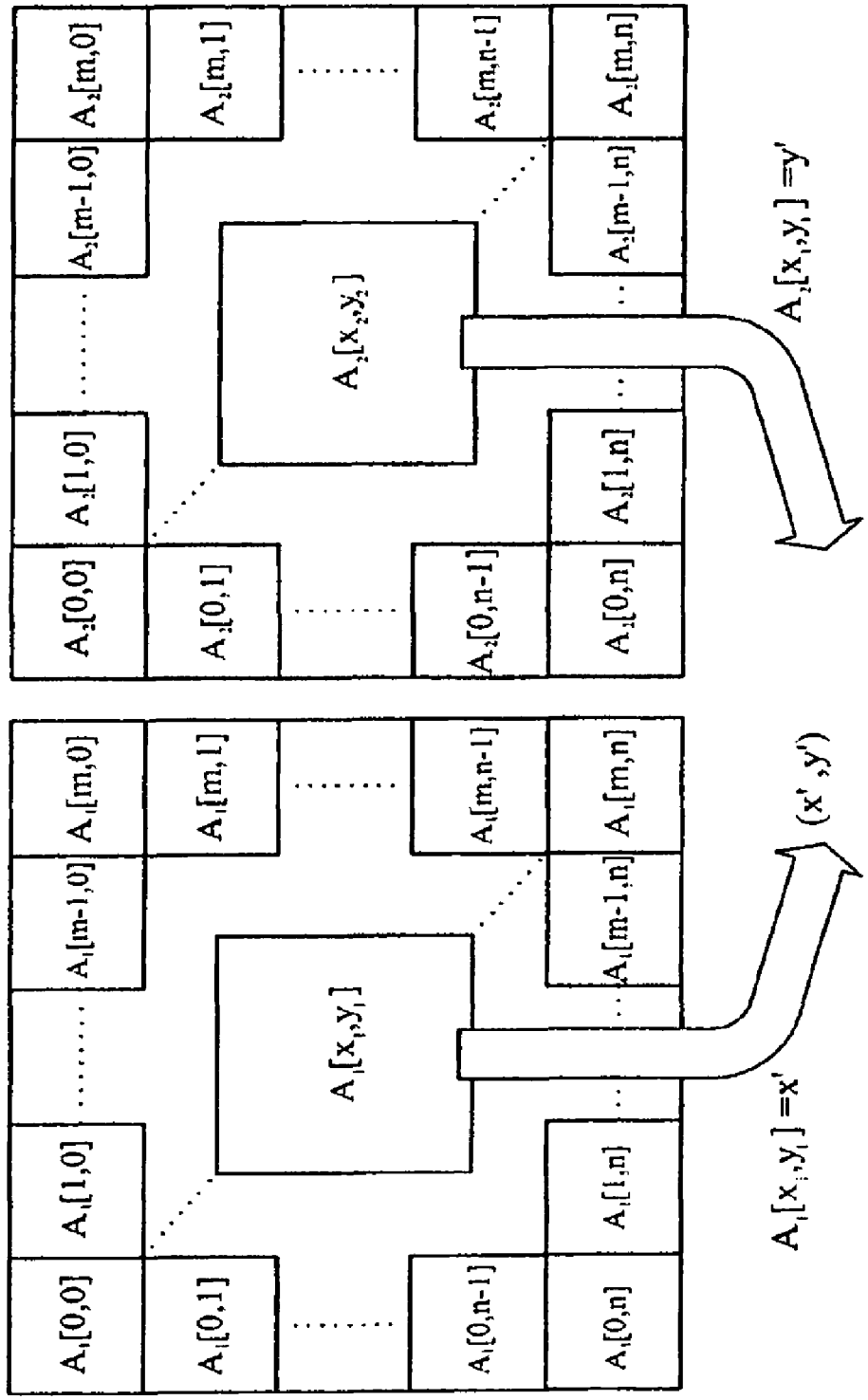
FIGS. 14 and 15 describes a method in which an interactive matrix lookup table process identifies actual coordinates from image coordinates by using the LUT database.
Figure 15:
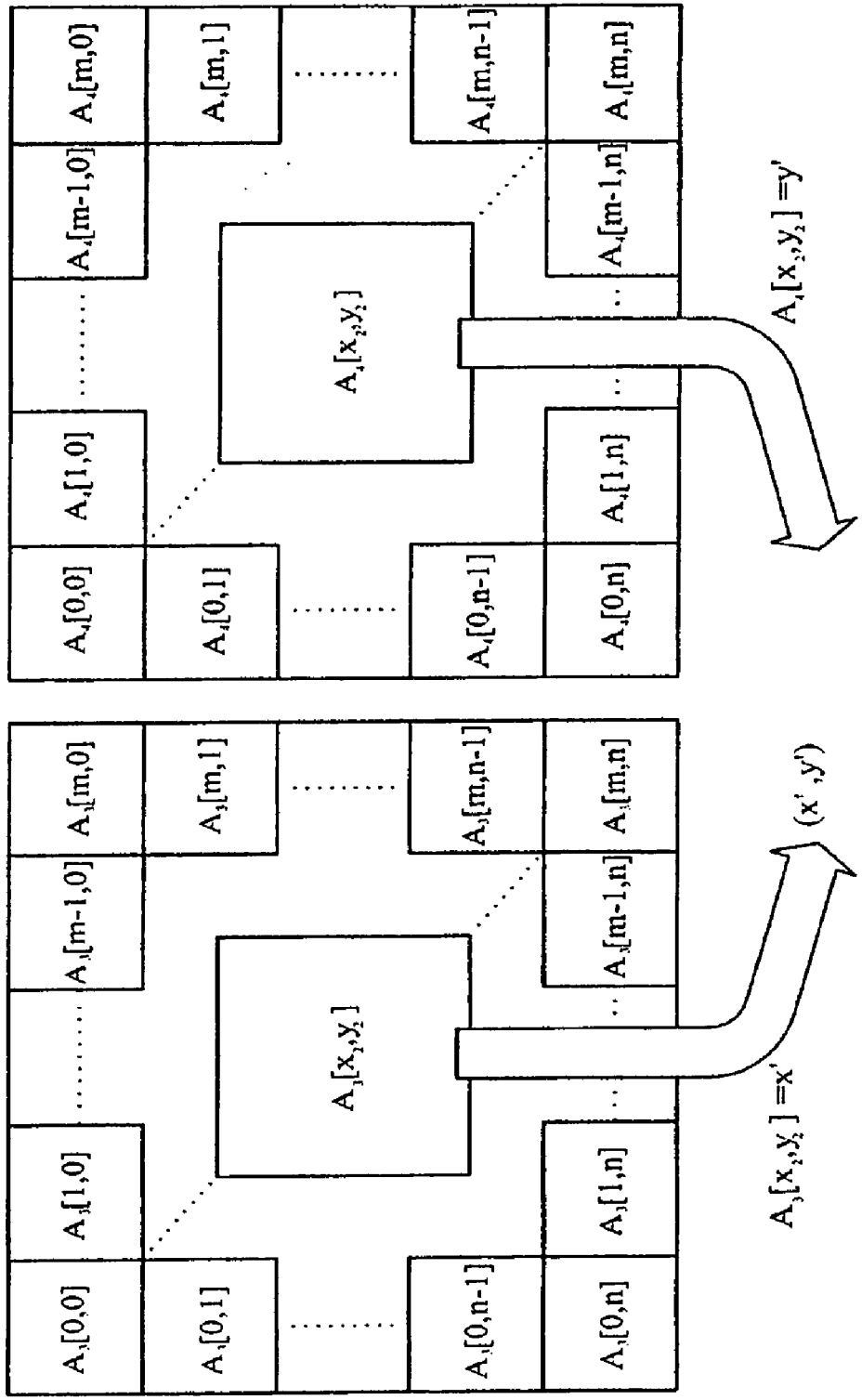

As shown in FIG. 14 and FIG. 15, through the interactive four-matrix lookup table process, by using the first, second, third, and fourth LUT databases, the actual coordinates (x'y') can be identified from the image coordinates (x,y) in the image taken by the first image capturing device 21 or the second image capturing device 22. In other words, the method of the present invention implements conversion of coordinates to achieve the purpose of positioning.

Figure 16:
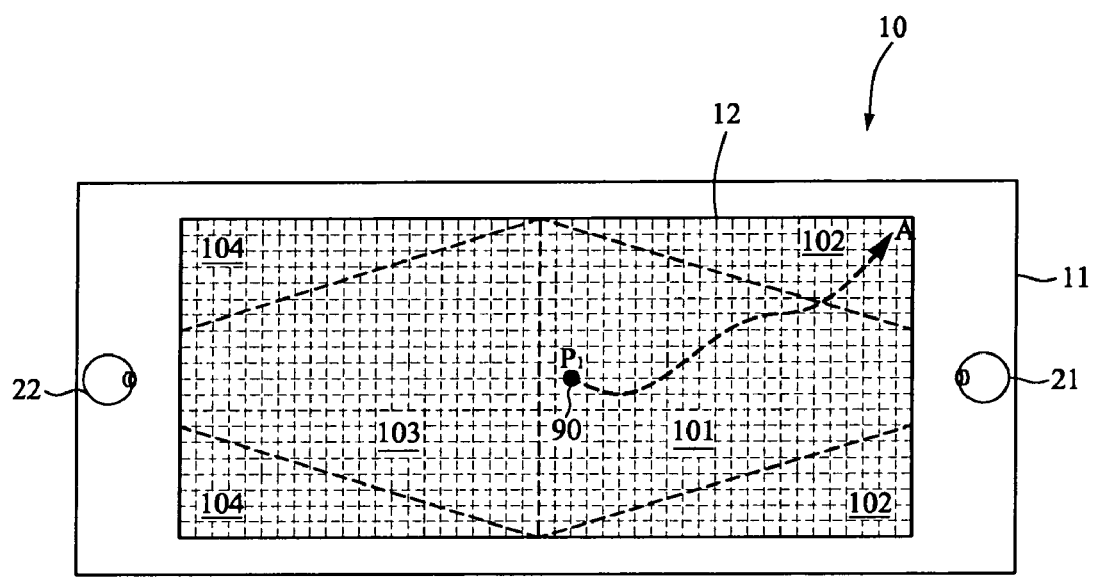
FIG. 16 explains how the present invention detects displacement and coordinates of an object.

FIG. 16 illustrates how the present invention employs the aforementioned system in detecting displacement and coordinates of an object controlled by a user. Therein, the object 90 may be of any size and shape without limitation, while the surface is preferably one absorbing light, not reflecting light, and being single-colored. The first image capturing device 21 and the second image capturing device 22 are coupled with a computer visual-based control system. The computer visual-based control system, under the user's setting, acquires information about the color and profile of the object from the images taken by the first image capturing device 21 and the second image capturing device 22, so as to identity the edge of the object most close to the surface of the planar area 10. Then the system calculates the center of the edge and takes it as an index point. Afterward, the system of the present invention uses the image coordinates (x, y) of the index point to determine the actual coordinates (x', y') of the object.

The object 90 under the user's control is placed above the planar area 10 with or without contacting the planar area 10 and thus has an initial point P1. Both of the first image capturing device 21 and the second image capturing device 22 take the images of the object 90 so as to obtain the image coordinates (x, y) of the object. Through the above-described interactive four-matrix lookup table process, by implementing Equation 7 and Equation 8, the actual coordinates (x', y') can be found from the corresponding LUT database after comparison. For example, when the image coordinates (x,y) of P1 indicates its location in the first block 101, and the image is provided by the first image capturing device 21, the actual coordinates (x',y') can be found from the first LUT database by means of comparison. Then, assuming that the object 90 is moved by the user from the initial point P1 along the direction indicated by Arrow A in the drawing, the lookup table process keeps operating to generate a plurality successive actual coordinates (X',Y') along the course of the object. When the object is moved to the second block 102, the set of image coordinates (x, y) is now within the second block 102, and the image is provided by the second image capturing device 22, so the actual coordinates (x', y') of the object 90 in the second block 102 can be found from the second LUT database by means of comparison.

By using the four-matrix lookup table process with the four LUT databases, no matter where the object 90 is in on the planar area 10 or how it moves along the planar area 10, its actual coordinates can be determined in a real-time manner. The identified actual coordinates may be particularly programmed and transmitted to a specific external software for application. Thereby, the locating and positioning effect of the present invention can be extensively applied, such as, to large dynamic billboards or to interactive games where instinctive operation is adopted. Since the lookup table process extracts established values, it performs in a much prompter manner than complex calculation does. Therefore, the present invention performs excellently when detecting displacement and location of an object in real time.

What is claimed is:

1. A displacement sensing system, for sensing a set of actual coordinates of an object in a planar specified area, the displacement sensing system comprising:

a planar area, the planar area containing M×N virtual grids, wherein each intersection point between adjacent two said grids has a set of actual coordinates, and the object is placed on the planar area;

a first image capturing device and a second image capturing device, settled at two opposite ends of a coordinate axis of the planar area, respectively, for capturing images of the planar area, wherein the planar area has a plurality of virtual blocks defined according to shooting ranges and shooting dead spaces of the first image capturing device and the second image capturing device, and each said intersection point in the corresponding said block has a set of image coordinates in the image of the planar area taken by the first image capturing device and has another set of image coordinates in another said image of the planar area taken by the second image capturing device;

a plurality of LUT databases quantitatively equal to the blocks and for use of a matrix lookup table process, each said LUT database containing the actual coordinates and the image coordinates of the intersection points within the corresponding said block, and the image coordinates and the actual coordinates of the same intersection point being associated in the LUT database; and a plurality of table indexes established in the LUT databases corresponding to the first image capturing device and the second image capturing device, wherein the table index corresponding to the first image capturing device contains an index value representing the first image capturing device, and the table index corresponding to the second image capturing device, contains another index value representing the second image capturing device, while each said table index contains an index value representing that the object is not in any of the defined blocks.

2. The displacement sensing system of claim 1, wherein the planar area is a front surface of an LCD covered by a wrapping material.

3. The displacement sensing system of claim 1, wherein the planar area is a movable module.

4. The displacement sensing system of claim 1, wherein the planar area is horizontally mounted on an immovable external object.

5. The displacement sensing system of claim 1, wherein the planar area is vertically mounted on an immovable external object.

6. The displacement sensing system of claim 1, wherein the first image capturing device is identical to the second image capturing device at least in a height it settled, a shooting range thereof and an image definition thereof.

7. The displacement sensing system of claim 1, wherein the blocks of the planar area includes a virtual first block defined according to the shooting range of the first image capturing device, a virtual second block defined according to the shooting dead space of the first image capturing device, a virtual third block defined according to the shooting range of the second image capturing device, and a virtual fourth block defined according to the shooting dead space of the second image capturing device.

8. The displacement sensing system of claim 7, wherein the shooting range of the first image capturing device includes the first block and the fourth block, while the shooting range of the second image capturing device includes the third block and the second block.

9. The displacement sensing system of claim 8, wherein, the first block at least extends from a first edge of the planar area adjacent to the first image capturing device to a symmetry axis of the planar area parallel to the first edge and the third block at least extends from a second edge of the planar area adjacent to the second image capturing device to the symmetry axis of the planar area, while the second block locates separately at two corners of the planar area adjacent to the first edge, and the fourth block locates separately at two corners of the planar area adjacent to the second edge.

10. The displacement sensing system of claim 8, wherein, the LUT databases include a first LUT database, a second LUT database, a third LUT database, and a fourth LUT database corresponding to the first block, the second block, the third block, and the fourth block, respectively.

11. The displacement sensing system of claim 10, wherein, the matrix lookup table process includes a first matrix lookup table process, a second matrix lookup table process, a third matrix lookup table process and a fourth matrix lookup table process, which use the first LUT database, the second LUT database, the third LUT database, and the fourth LUT database, respectively.

* * * * *